(12) United States Patent
Ljolje et al.

(10) Patent No.: US 10,699,702 B2
(45) Date of Patent: *Jun. 30, 2020

(54) SYSTEM AND METHOD FOR PERSONALIZATION OF ACOUSTIC MODELS FOR AUTOMATIC SPEECH RECOGNITION

(71) Applicant: Nuance Communications, Inc., Burlington, MA (US)

(72) Inventors: Andrej Ljolje, Morris Plains, NJ (US); Diamantino Antonio Caseiro, Philadelphia, PA (US); Alistair D. Conkie, San Jose, CA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/830,535

(22) Filed: Dec. 4, 2017

(65) Prior Publication Data

US 2018/0090130 A1  Mar. 29, 2018

Related U.S. Application Data

(63) Continuation of application No. 15/595,131, filed on May 15, 2017, now Pat. No. 9,837,072, and a (Continued)

(51) Int. Cl.
*G10L 15/28* (2013.01)
*G10L 15/32* (2013.01)
*G10L 15/07* (2013.01)
*G10L 15/04* (2013.01)
*G10L 15/08* (2006.01)
*G10L 15/14* (2006.01)
*G10L 15/22* (2006.01)
*G10L 15/06* (2013.01)

(52) U.S. Cl.
CPC .............. *G10L 15/07* (2013.01); *G10L 15/04* (2013.01); *G10L 15/083* (2013.01); *G10L 15/14* (2013.01); *G10L 15/22* (2013.01); *G10L 15/28* (2013.01); *G10L 15/32* (2013.01); *G10L 15/063* (2013.01)

(58) Field of Classification Search
CPC combination set(s) only.
See application file for complete search history.

(56) References Cited

U.S. PATENT DOCUMENTS 5,732,187 A  3/1998  Scruggs et al.
5,754,978 A  5/1998  Perez-Mendez et al.
(Continued)

*Primary Examiner* — Jialong He

(57) ABSTRACT

Disclosed herein are methods, systems, and computer-readable storage media for automatic speech recognition. The method includes selecting a speaker independent model, and selecting a quantity of speaker dependent models, the quantity of speaker dependent models being based on available computing resources, the selected models including the speaker independent model and the quantity of speaker dependent models. The method also includes recognizing an utterance using each of the selected models in parallel, and selecting a dominant speech model from the selected models based on recognition accuracy using the group of selected models. The system includes a processor and modules configured to control the processor to perform the method. The computer-readable storage medium includes instructions for causing a computing device to perform the steps of the method.

20 Claims, 6 Drawing Sheets

Related U.S. Application Data continuation of application No. 14/700,324, filed on Apr. 30, 2015, now Pat. No. 9,653,069, which is a continuation of application No. 12/561,005, filed on Sep. 16, 2009, now Pat. No. 9,026,444.

(56) References Cited

U.S. PATENT DOCUMENTS

| | | |
|---|---|---|
| 5,806,034 A | 9/1998 | Naylor |
| 5,864,810 A | 1/1999 | Digalakis et al. |
| 5,895,448 A | 4/1999 | Vysotsky et al. |
| 5,950,158 A | 9/1999 | Wang |
| 5,950,397 A | 9/1999 | Rahim |
| 6,088,669 A | 7/2000 | Maes |
| 6,487,530 B1 | 11/2002 | Lin et al. |
| 6,487,534 B1 | 11/2002 | Thelen |
| 6,526,380 B1 | 2/2003 | Thelen et al. |
| 6,671,569 B1 | 12/2003 | Garudadri et al. |
| 6,766,295 B1 | 7/2004 | Murveit et al. |
| 6,799,162 B1 | 9/2004 | Goronzy et al. |
| 6,952,674 B2 | 10/2005 | Forand |
| 6,996,525 B2 | 2/2006 | Bennett et al. |
| 7,065,487 B2 | 6/2006 | Miyazawa |
| 7,203,651 B2 | 4/2007 | Baruch et al. |
| 7,219,055 B2 | 5/2007 | Lucke |
| 7,340,396 B2 | 3/2008 | Thomson et al. |
| 7,373,301 B2 | 5/2008 | Kemp et al. |
| 7,630,878 B2 | 12/2009 | Fingscheidt et al. |
| 7,899,669 B2 | 3/2011 | Gadbois |
| 8,374,867 B2 | 2/2013 | Ljolje |
| 2002/0143540 A1 | 10/2002 | Malayath et al. |
| 2003/0050783 A1 | 3/2003 | Yoshizawa |
| 2003/0125947 A1 | 7/2003 | Yudkowsky |
| 2004/0073425 A1 | 4/2004 | Das et al. |
| 2005/0149337 A1 | 7/2005 | Asadi et al. |
| 2008/0208578 A1 | 8/2008 | Geller |
| 2010/0004930 A1 | 1/2010 | Strope et al. |
| 2010/0185444 A1 | 7/2010 | Olsen |

SYSTEM AND METHOD FOR PERSONALIZATION OF ACOUSTIC MODELS FOR AUTOMATIC SPEECH RECOGNITION

PRIORITY INFORMATION

The present application is a continuation of U.S. patent application Ser. No. 15/595,131, filed May 15, 2017, which is a continuation of U.S. patent application Ser. No. 14/700,324, filed Apr. 30, 2015, now U.S. Pat. No. 9,653,069, issued May 16, 0217, which is a continuation of U.S. patent application Ser. No. 12/561,005, filed Sep. 16, 2009, now U.S. Pat. No. 9,026,444, issued May 5, 2015, the contents of which are incorporated herein by reference in their entirety.

BACKGROUND

1. Technical Field

The present disclosure relates to automatic speech recognition and more specifically to personalization of acoustic models for automatic speech recognition.

2. Introduction

Speech recognition applications rely on speech recognition models. Often, a generic speech model is used to recognize speech from multiple users. However, a single canonical model that represents all speakers generically is not well suited to many individuals in a given population. Individual speakers diverge from such a generic speech model in subtle and not so subtle ways. Thus, one possible approach is complete personalization, or providing a personal speech recognition model for each speaker. Current automatic speech recognition systems often associate the personalized speech model with a specific device, such as a cellular phone. For example, an automatic speech recognition system can identify the cellular phone by using caller ID, and then retrieve the personalized speech model associated with that cellular phone.

However, in reality the device, such as the cellular phone, is shared among family members and friends. Additionally, people use such device in a variety of different ways in many varying environments resulting in a wide variety of background noise types and usage modes. For example, the microphone can be near the mouth with dominant mouth noises, or far from the mouth with dominant background noises. In such varying environments, oftentimes the personalized speech model can perform much worse than generic speaker independent model.

Furthermore, current acoustic model adaptation algorithms assume consistent conditions in the adaptation data as well as the recognition data. The data collected from a communication device varies over time, but generally the conditions that affect speech recognition include: different user, how close or far the mouth is from the communication device, background noise, and different recording venue such as office, home, or vehicle. Conventional adaptation approaches do not work in such situations as the dominant condition would dominate the adaptation resulting in an inappropriate model for many conditions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are methods, systems, and tangible computer-readable storage media for automatic speech recognition. The method includes causing a processor to perform the steps including selecting a speaker independent model, and selecting a quantity of speaker dependent models, the quantity of speaker dependent models being based on available computing resources, the selected models including the speaker independent model and the quantity of speaker dependent models.

The method also includes recognizing an utterance using each of the selected models in parallel, and selecting a dominant speech model from the selected models. The method, in one embodiment, includes dropping one of the selected speech models if a recognition efficiency is below a threshold, and identifying a communication device and selecting speaker dependent models based on the identified communication device. In a further embodiment, the method includes selecting speaker dependent models based on a user profile associated with the communication device, and receiving utterances from the communication device and clustering the utterances to generate new speaker/condition dependent models/adaptations.

The method also includes iteratively selecting a quantity of speaker dependent models, recognizing the utterance, and selecting a dominant speech model each time an utterance is received until a conversation associated with the utterances terminates, or alternatively until a dominant speech model is selected.

The system includes a processor and modules configured to control the processor to perform the steps of the method. The computer-readable storage medium includes instructions to cause a computing device to perform the steps of the method. In one example the system selects a model for elderly females based on the user ID information. The system can then use variants of that model in parallel for high and low ambient noise, as resulted from clustering some past data into two classes, where the beam search determines by the end of the utterance which of the two was more successful. The system uses the better scoring model's recognition output. The system can cluster the utterances off line and generate a new model/adaptation transformations for each cluster.

In a beam search approach, a system practicing the method includes models for specific conditions, assuming those conditions are known. Some conditions include gender, age, geographical area based dialect etc. In a generic model adaptation based approach, the system may be more efficient and require much less data than a beam search approach based system. The system clusters a pool of data into a number of types automatically and generates a model (or adaptation) for each cluster, which loosely corresponds to a condition: a member of a family, different recording environment, etc. In general, the first class of models can be collected across many devices and speakers, whereas the second group of model/adaptation types is generally generated on a per device or per speaker basis.

In a first case, a selection module can select an appropriate initial model or adaptation algorithm based on the device ID, user's gender, age, and/or geographical location/dialect. In a second case, the system combines all the models into a single search with all the models running in parallel, without the knowledge of the decoder which part belongs to which model. The beam search keeps active all the parts of all models that score within a "beam" of the best path at any given time. After a short period, only 0.5 seconds or 1 second into an utterance, the dominant path and all the paths within the beam might contain only a small group or possibly even one dominant model for that utterance or dialog. With a new dialog, the system starts with all the models in parallel as there is no a priori knowledge regarding which model is the most appropriate. For instance, the dominant model in one dialog might be the first one dropped in the following dialog.

In a third case, the system develops a mechanism for detecting which model is the mode appropriate for the models that resulted from clustering a data pool collected from a number of previous speech utterances. Then the system just the most appropriate model. In one example, the system estimates the signal-to-noise ratio (SNR), the height of the speaker's pitch, etc. The system can cluster utterances at any time to train condition dependent models/adaptation transformations. The system generally clusters utterances as part of an off-line training, while the rest is part of the recognition process and is completed when the speech is generated with minimal latency.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
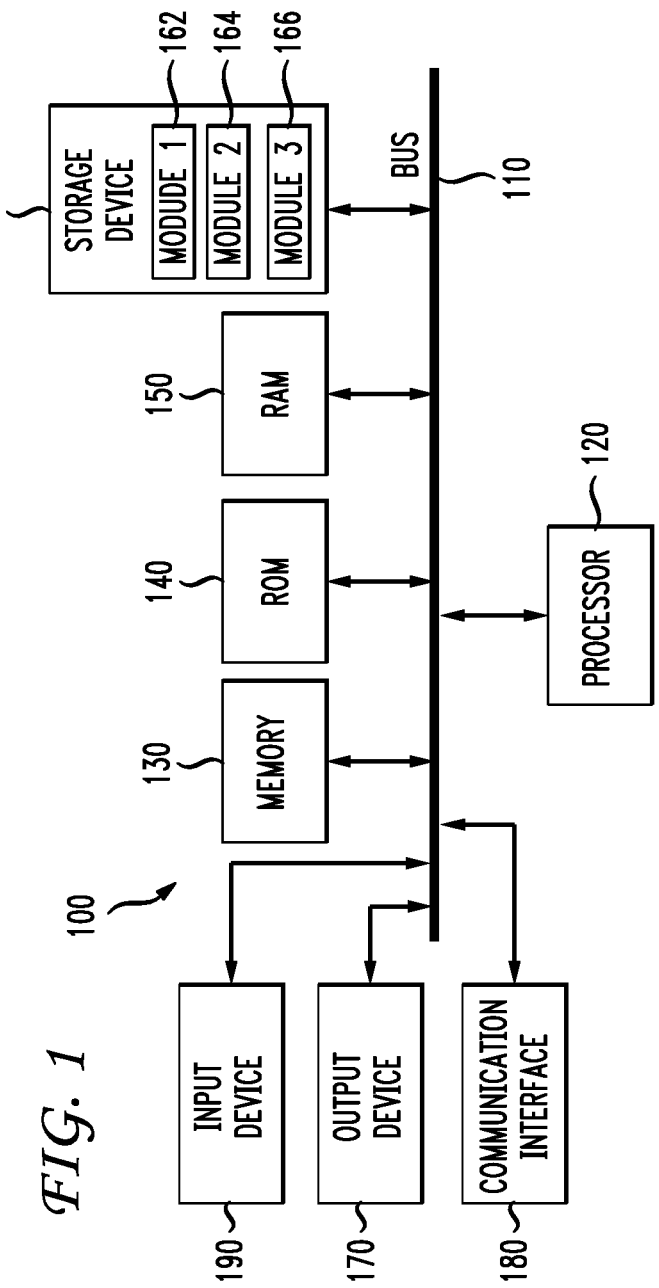
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules module 1 162, module 2 164 and module 3 166 which are modules configured to control the processor 120. These modules may be stored on the storage device 160 and loaded into RAM 150 or memory 130 at runtime or may be stored as would be known in the art in other computer-readable memory locations.

Figure 2:
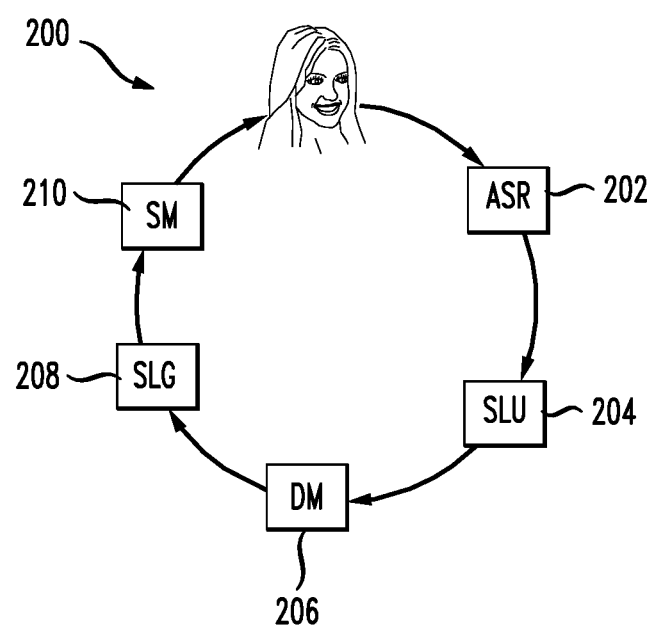
FIG. 2 is a functional block diagram that illustrates an exemplary natural language spoken dialog system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
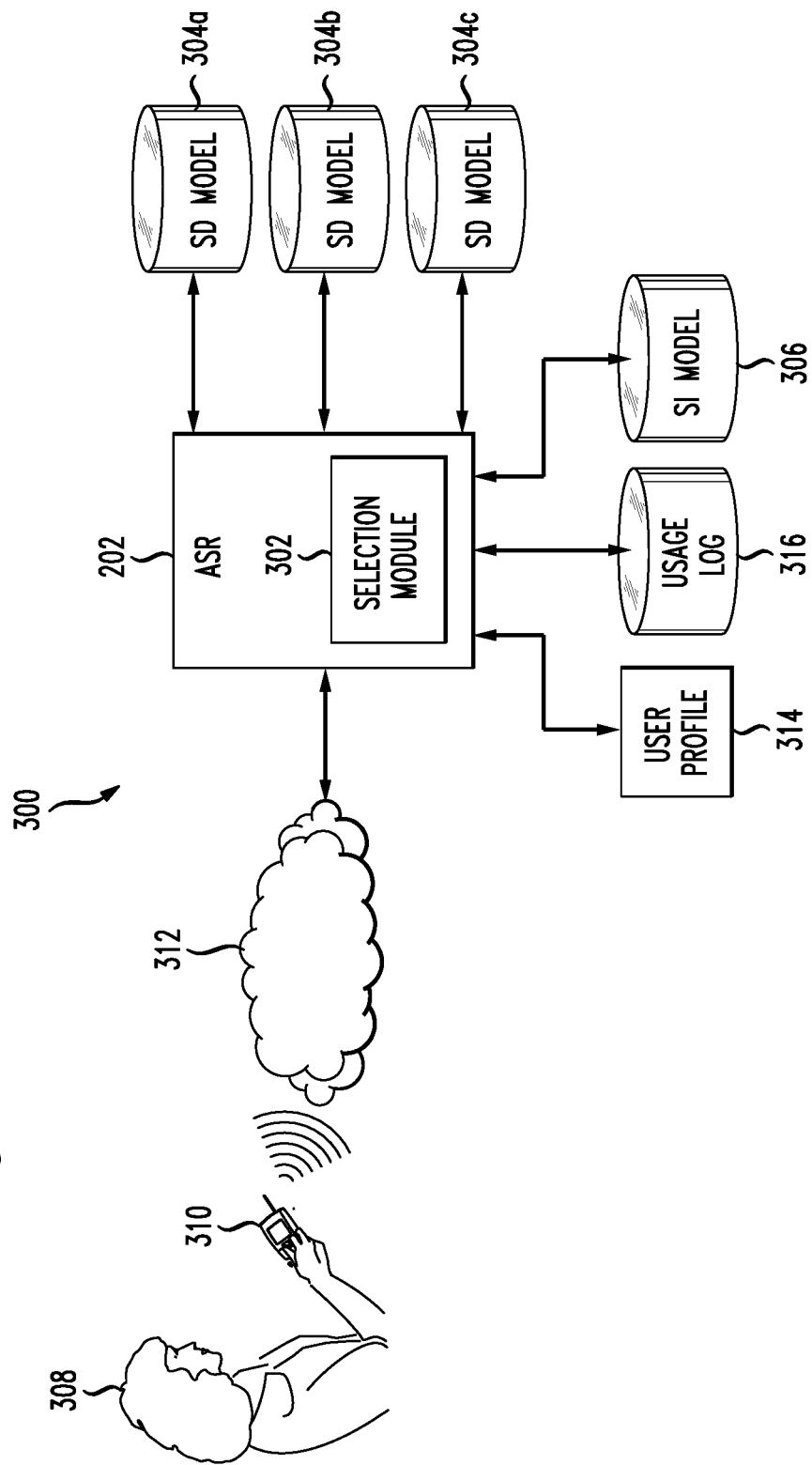
FIG. 3 is a schematic block diagram illustrating one embodiment of a system for automatic speech recognition.

FIG. 3 is a schematic block diagram illustrating one embodiment of a system 300 for automatic speech recognition. The system 300 includes the natural language spoken dialog system 200 of FIG. 2, however for clarity, only the ASR 202 is depicted here. The ASR 202, in one embodiment, includes a selection module 302 that selects speech models. The speech models include speaker dependent speech models (SD model) 304a, 304b, 304c, and a speaker independent speech model (SI model) 306.

The SD models 304a, 304b, 304c may all correlate to a single user 308 or a single communication device 310. Alternatively, each SD model 304a, 304b, 304c may correlate to a different user of the same or different communication device 310. One example of multiple users using the same device would be members of a family that all use a common telephone. The system can determine which family member is speaking at the beginning of a dialog and use that user's model for the remaining portion of the dialog. In another example, each SD model 304a, 304b, 304c may correlate to the same user 308 but in different environments. In other words, there may be a SD model 304a for the user 308 while at work, a SD model 304b for the user 308 while at home, and a SD model 304c for the user 308 while at the gym. The system 300 maintains multiple different SD models 304a, 304b, 304c because background or ambient noise can greatly affect the automatic speech recognition experience of the user 308.

The communication device 310 can be a cellular phone as depicted. The communication device 310 can also be a land line phone, cordless phone, and/or a software phone. The communication device 310 is capable of communicating with the ASR 202 over a communications network 312. The communications network 312 is any network that enables telephone communications and including but not limited to cellular networks, VoIP capable networks like the Internet, and POTS.

The selection module 302 selects which models to use in automatic speech recognition based on at least one of a user profile 314, a usage log 316, and the available computing resources of the system 300. The user profile 314 contains information for identifying the user 308. This information is, for example, caller identification information so that the ASR 202 can identify the user 308 based on the phone number of the communication device 310. Alternatively, the user profile 314 may contain other user 308 identifiable information such as a username and password. In another embodiment, the selection module 302 compares demographical information of the user 308 with the user profile 314 to ensure that the person using the communication device 310 is the user associated with the user profile 314, and ensure that the correct speech model is selected. Demographical information, in one embodiment, includes, but is not limited to, age, gender, ethnicity, etc.

The usage log 316 maintains a history of speech recognition success using the SD models 304a, 304b, 304c. The ASR 202, for example, updates the usage log 316 following each automatic speech recognition session to improve future sessions with the same user. In other words, the ASR 202 may detect that when the user 308 is at work, SD model 304c is the dominant speech recognition model. As used herein, the term dominant refers to the speech model that most effectively recognizes an utterance, or put differently, is the most efficient speech recognition model of the available speech models.

Although the automatic speech recognition systems 200, 300 of FIGS. 2 and 3 depict centralized systems, one or more of the components and modules may be distributed across the communications network 312. For example, the ASR 202 and SD models 304a, 304b, 304c may be implemented on the communication device 310. In other words, the illustrations of FIGS. 2 and 3 are not intended to limit the disclosure to the depicted embodiments, rather, they are shown for illustrative purposes only.

Figure 4:
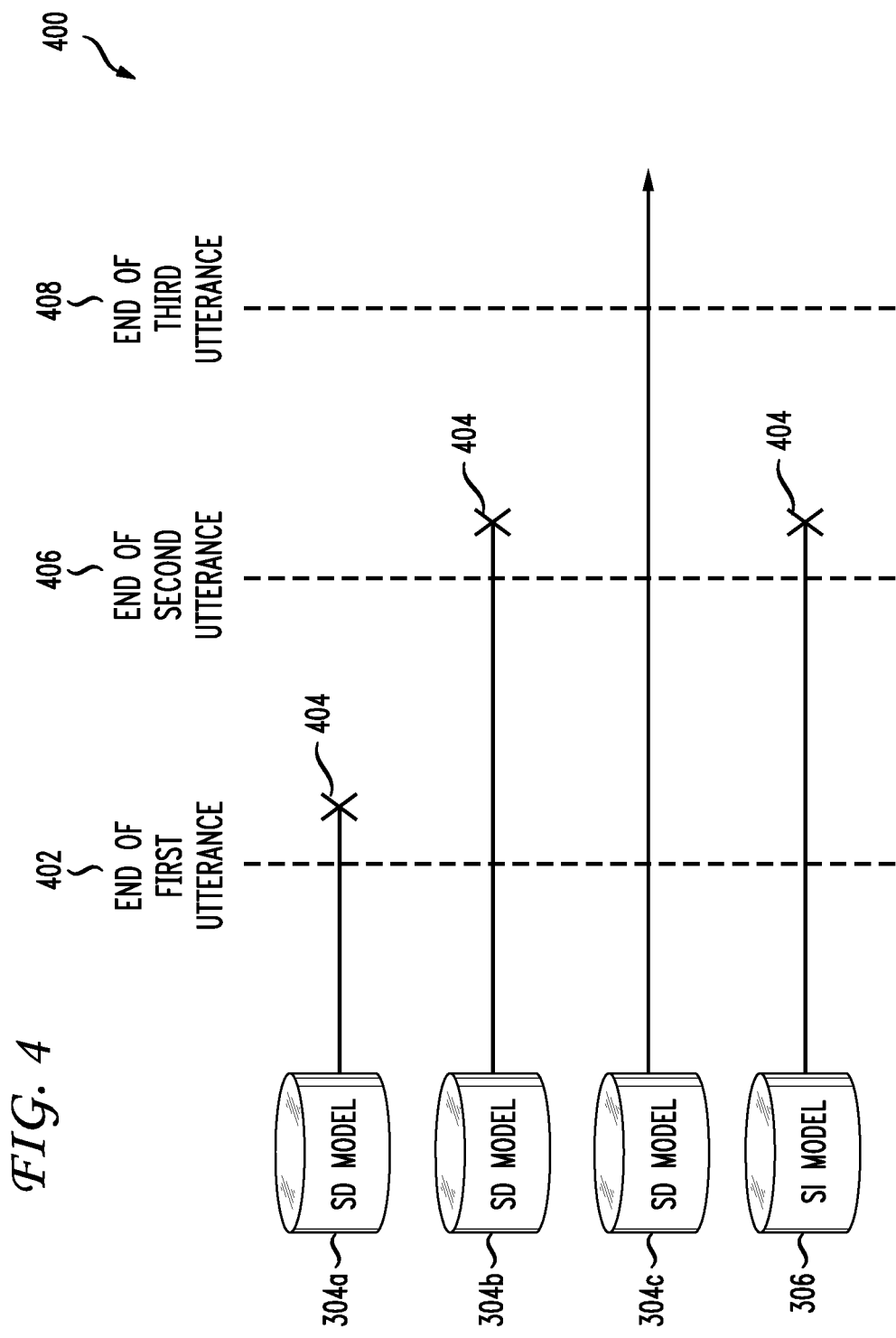
FIG. 4 is a schematic block diagram illustrating one embodiment of parallel automatic speech recognition.

FIG. 4 is a simplified schematic block diagram illustrating a beam search embodiment 400. As described above, the automatic speech recognition system 300 recognizes utterances using different speech models in parallel. For example, a computing device similar to the computing device 100 of FIG. 1 may initialize multiple instances of the ASR 202, each instance of the ASR 202 recognizing an utterance using one of the speech models 304a, 304b, 304c, 306, while other instances of the ASR 202 simultaneously recognize the utterance using another of the speech models 304a, 304b, 304c, 306. Alternatively, one instance of the ASR 202 may simultaneously recognize an utterance using different search models 304a, 304b, 304c, 306.

In one embodiment, the selection module 302 of FIG. 3 determines, according to available system resources, how many speech models 304a, 304b, 304c, 306, may be simultaneously utilized to recognize an utterance. Alternatively, the selection module 302 determines the quantity of speech models 304a, 304b, 304c, 306 according to available processing together with an evaluation of how many SD models 304a, 304b, 304c are associated with a user profile 314. This evaluation may also include analyzing the gender, age, and ethnicity of the user and/or the environment or background noise associated with the utterance.

The selection module 302, in one embodiment, uses a heuristic search algorithm to select a dominant speech model. A beam search algorithm is one example of a heuristic search algorithm. The beam search uses a breadth-first search to store the selected speech models which include at least the SI model 306 and as many SD models 304a, 304b, 304c as allowable according to available processing resources. During each utterance, speech models that are performing below an acceptable threshold are dropped. FIG. 4 illustrates this process in a simplified manner.

In the depicted illustration, the selection module 302 has selected the fallback generic SI model 306 and three SD models 304a, 304b, 304c. However, more or less speech models may be selected according to available processing resources and/or the number of available SD models 304a, 304b, 304c. At the end of the first utterance 402, the selection module 302 determines that SD model 304a is not recognizing the utterance with sufficient efficiency and is therefore dropped 404. Following the second utterance 406, the selection module 302 drops 404 SD model 304b and SI model 306 having determined that SD model 304c is the dominant speech model. For this automatic speech recognition session, ASR 202 will continue using SD model 304c. This process may occur each time the user 308 of FIG. 3 initiates an automatic speech recognition session.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagram, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown. One or more steps of the following methods are performed by a hardware component such as a processor or computing device.

Figure 5:
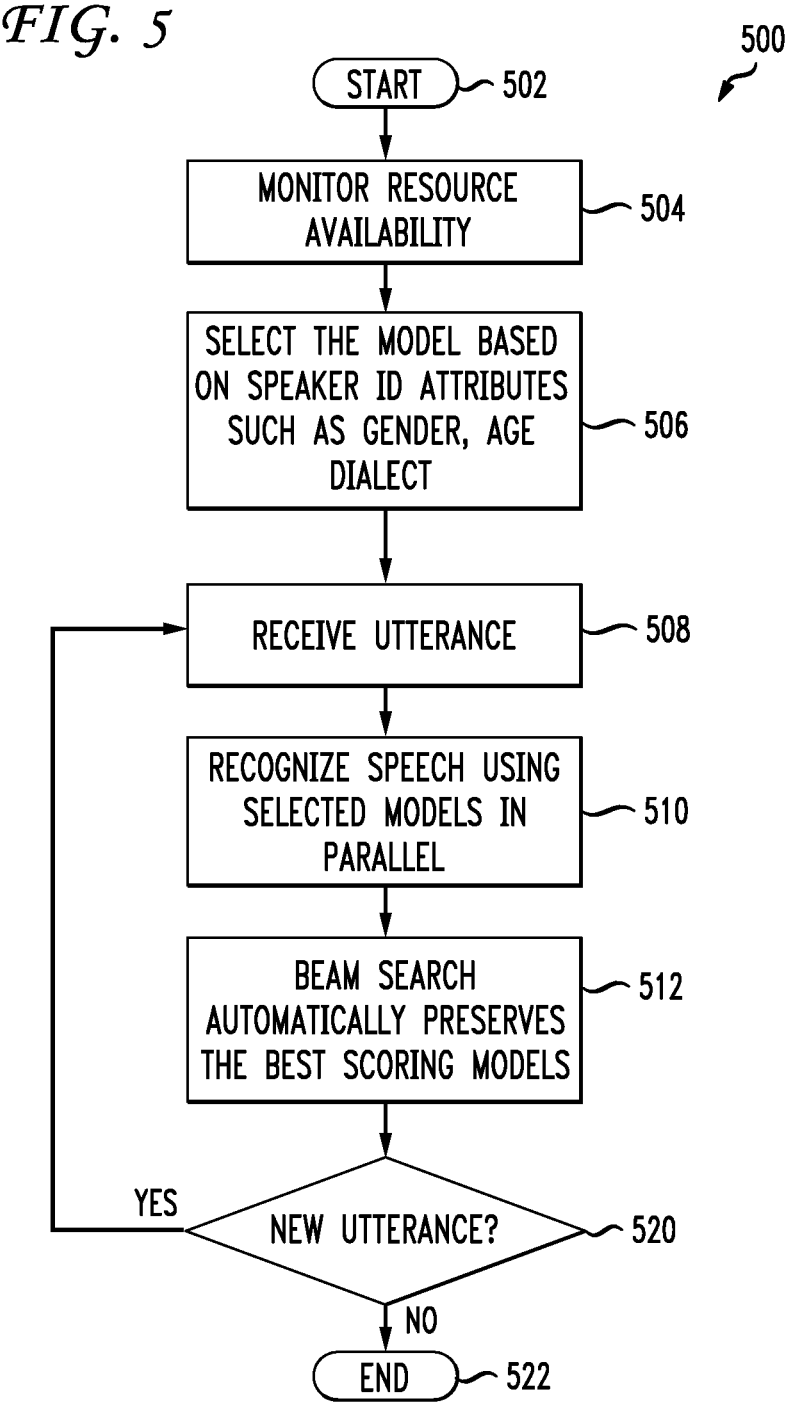
FIG. 5 is a schematic flow chart diagram illustrating one embodiment of a method for automatic speech recognition.

FIG. 5 is a schematic flow chart diagram illustrating one embodiment of a method 500 for automatic speech recognition. The method 500, in one embodiment, starts 502 and the selection module 302 of FIG. 3 monitors 504 processing resources availability. Monitoring 504 processing resources includes evaluating available processing cycles as well as available memory. The selection module 302 then selects 506 a model based on speaker identification attributes such as gender, age and dialect, and further based on the availability of resources. Alternatively, the selection module 302 may select 506 a quantity of SD models 304a, 304b, 304c according to the user profile 314 and the usage log 316.

The method 500 continues and the ASR 202 of FIGS. 2 and 3 receives 508 an utterance from the user 308 and initiates parallel automatic speech recognition 510 using the selected SD models 304a, 304b, 304c together with the SI model 306. In one embodiment, the SI model 306 is initiated as a fallback speech model to prevent total speech recognition failure because the SD models 304a, 304b, 304c do not efficiently recognize the utterance. Alternatively, the ASR module 202 recognizes 510 the utterance using only the SD models 304a, 304b, 304c.

As described above with reference to FIG. 4, the selection module 302 includes a beam search which automatically preserves the best scoring models 512. In one embodiment, underperforming speech models refers to speech models that have a speech recognition efficiency that is below a threshold, by way of example only, a recognition rate of 70%. In one embodiment, the selection module 302 maintains the SD models 304a, 304b, 304c even though they are not the dominant speech model as long as the speech recognition efficiency of the SD models 304a, 304b, 304c remains above the threshold. If the ASR 202 does not receive a new utterance 520, the method 500 ends 522. Alternatively, the ASR 202 receives a new utterance 508 and the method 500 continues as described above.

Figure 6:
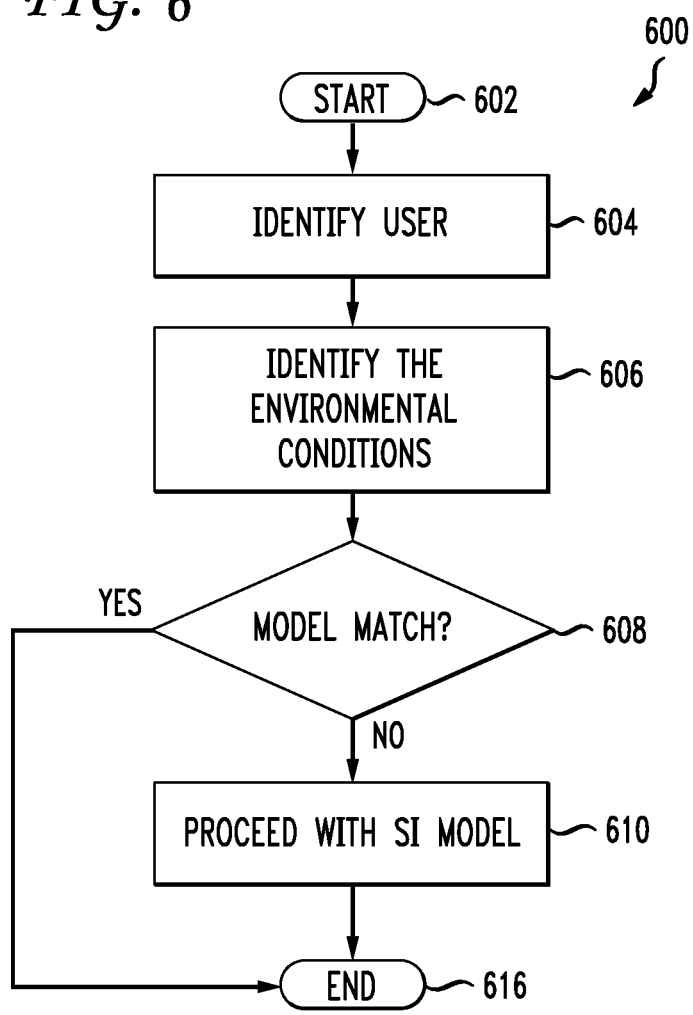
FIG. 6 is a schematic flow chart diagram illustrating another method of automatic speech recognition.

FIG. 6 is a schematic flow chart diagram illustrating another method 600 of automatic speech recognition. The method 600, in one embodiment, starts 602 and the selection module 302 of FIG. 3 identifies 604 the user. As previously described, the selection module 302 may identify the user based on the caller identification information of the communication device 310. Alternatively, the selection module 302 may identify the user based on a user profile 314, username, age, gender, or ethnicity. The selection module 302 then identifies 606 the environmental conditions to properly select an appropriate SD model 304a, 304b, 304c.

The selection module 302 then compares the speech recognition efficiency to determine 608 whether the selected SD model 304a, 304b, 304c is appropriate. In other words, the variations of environment and circumstances under which users engage automatic speech recognition systems wildly vary. A SD model 304a, 304b, 304c that properly recognizes utterances one day, may not be effective another. As such, if the selection module 302 determines 608 that the selected SD model 304a, 304b, 304c is not effective, the selection module 302 proceeds 610 with the SI model 306.

Embodiments within the scope of the present disclosure may also include tangible computer-readable storage media for carrying or having computer-executable instructions or data structures stored thereon for controlling a data processing device or other computing device. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   recognizing received speech via each model in a group of speech recognition models, to yield recognition results;
   selecting, based on the recognition results, a dominant speech model from the group of speech recognition models to yield a remainder set of dropped speech recognition models; and
   continuously using only the dominant speech model, without applying the remainder set of dropped speech recognition models, to recognize additional speech received from a user, wherein the additional speech is separate from the received speech and wherein the additional speech is recognized only by the dominant speech model after the received speech is recognized by the group of speech recognition models.

2. The method of claim 1, further comprising:
   identifying, via a processor, the group of speech recognition models, wherein the group of speech recognition models comprises a speaker independent model and a speaker dependent model.

3. The method of claim 1, wherein recognizing the received speech via each model in the group of speech recognition models is performed in parallel.

4. The method of claim 1, wherein selecting the dominant speech model from the group of speech recognition models is performed using a heuristic search algorithm.

5. The method of claim 1, wherein the additional speech received from the user is received during a remainder of an automatic speech recognition session.

6. The method of claim 1, further comprising dropping a speech model from the group of speech recognition models when recognition accuracy is below a threshold.

7. The method of claim 1, further comprising selecting at least one speech recognition model from the group of speech recognition models based on a device.

8. The method of claim 7, further comprising selecting at least one speech recognition model from the group of speech recognition models based on a plurality of users associated with the device.

9. The method of claim 1, further comprising receiving additional utterances from a device and clustering the additional utterances to generate a new speaker dependent model.

10. The method of claim 1, further comprising iteratively generating a group of selected models, recognizing the received speech, and selecting the dominant speech model, each time a new automatic speech recognition session is initiated.

11. The method of claim 1, wherein the group of speech recognition models is associated with a current location of a device for use in future speech dialogs.

12. A system comprising:
a processor; and
a computer-readable storage medium having instructions stored which, when executed by the processor, cause the processor to perform operations comprising:
recognizing received speech via each model in a group of speech recognition models, to yield recognition results;
selecting, based on the recognition results, a dominant speech model from the group of speech recognition models to yield a remainder set of dropped speech recognition models; and
continuously using only the dominant speech model, without applying the remainder set of dropped speech recognition models, to recognize additional speech received from a user, wherein the additional speech is separate from the received speech and wherein the additional speech is recognized only by the dominant speech model after the received speech is recognized by the group of speech recognition models.

13. The system of claim 12, wherein the computer-readable storage medium stores additional instructions which, when executed by the processor, cause the processor to perform operations further comprising:
identifying the group of speech recognition models, wherein the group of speech recognition models comprises a speaker independent model and a speaker dependent model.

14. The system of claim 12, wherein recognizing the received speech via each model in the group of speech recognition models is performed in parallel.

15. The system of claim 12, wherein the computer-readable storage medium stores additional instructions which, when executed by the processor, cause the processor to perform operations further comprising:
selecting at least one speech recognition model from the group of speech recognition models based on a device.

16. The system of claim 12, wherein the computer-readable storage medium stores additional instructions which, when executed by the processor, cause the processor to perform further operations comprising:
receiving additional utterances from a device and clustering the additional utterances to generate a new speaker dependent model.

17. A computer-readable storage device having instructions stored which, when executed by a computing device, result in the computing device performing operations comprising:
recognizing received speech via each model in a group of speech recognition models, to yield recognition results;
selecting, based on the recognition results, a dominant speech model from the group of speech recognition models to yield a remainder set of dropped speech recognition models; and
continuously using only the dominant speech model, without applying the remainder set of dropped speech recognition models, to recognize additional speech received from a user, wherein the additional speech is separate from the received speech and wherein the additional speech is recognized only by the dominant speech model after the received speech is recognized by the group of speech recognition models.

18. The computer-readable storage device of claim 17, wherein the computer-readable storage device has additional instructions stored which, when executed by the computing device, result in the computing device performing operations further comprising:
identifying, via a processor, the group of speech recognition models, wherein the group of speech recognition models comprises a speaker independent model and a speaker dependent model.

19. The computer-readable storage device of claim 17, wherein recognizing the received speech via each model in the group of speech recognition models is performed in parallel.

20. The computer-readable storage device of claim 17, wherein selecting the dominant speech model from the group of speech recognition models is performed using a heuristic search algorithm.

* * * * *